Jan. 27, 1970  D. F. MORGAN  3,491,663
EXTENDIBLE STEERING COLUMN
Filed April 5, 1968  2 Sheets-Sheet 1
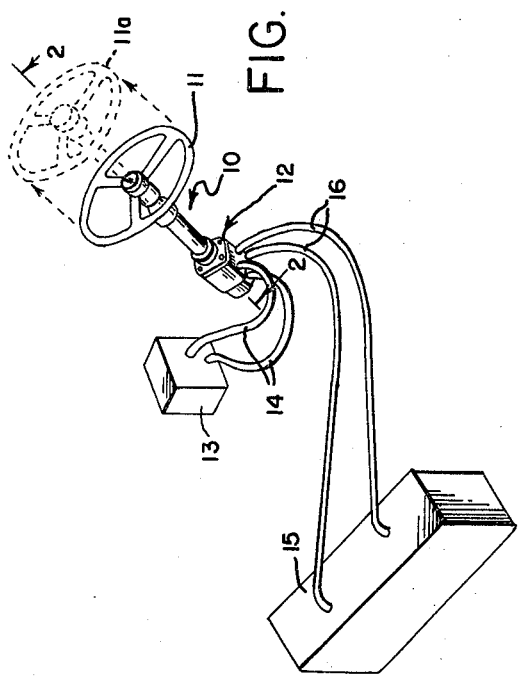
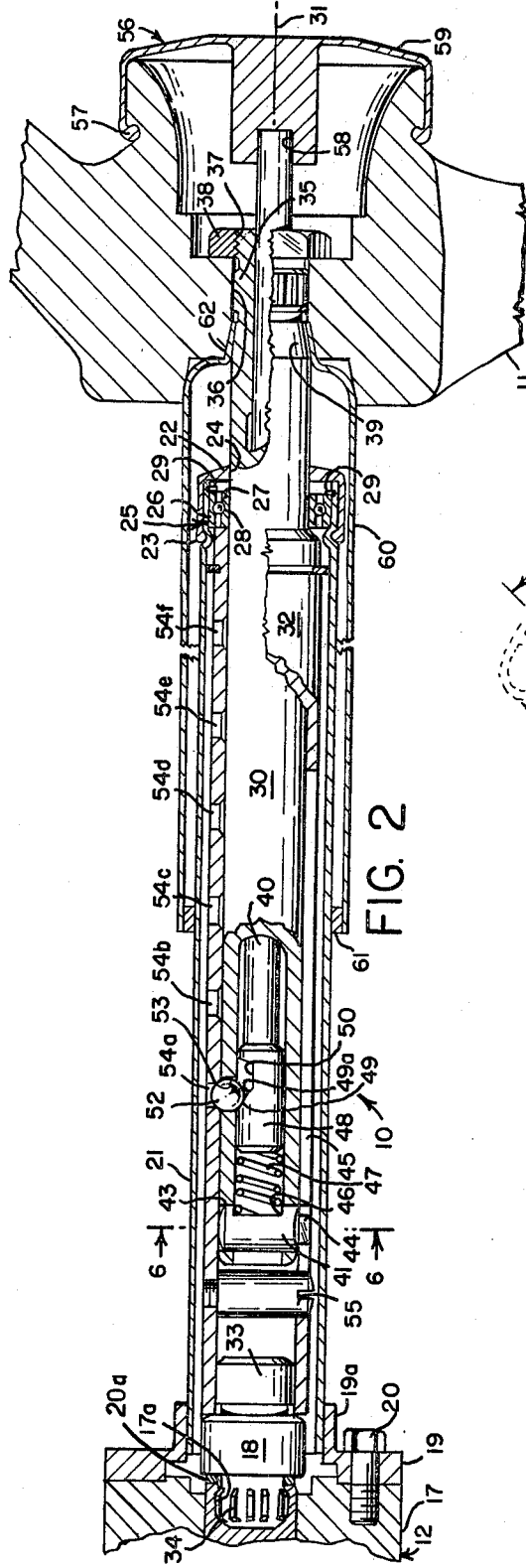
INVENTOR.
DAVID F. MORGAN
BY
*Robert W. Doyle*
ATTORNEY Jan. 27, 1970   D. F. MORGAN   3,491,663
EXTENDIBLE STEERING COLUMN
Filed April 5, 1968   2 Sheets-Sheet 2
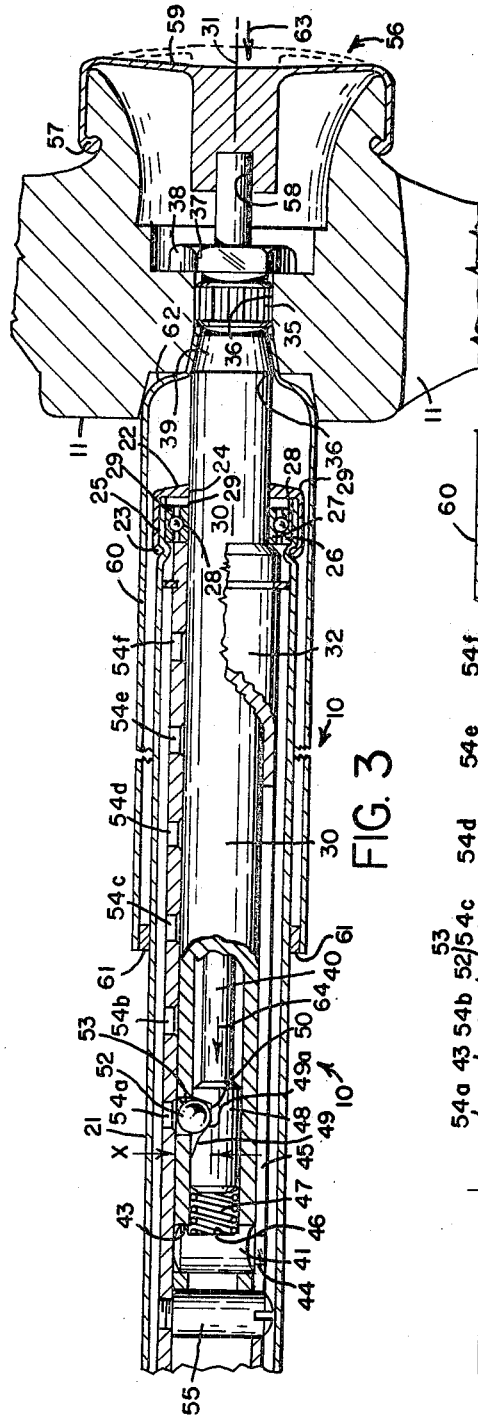
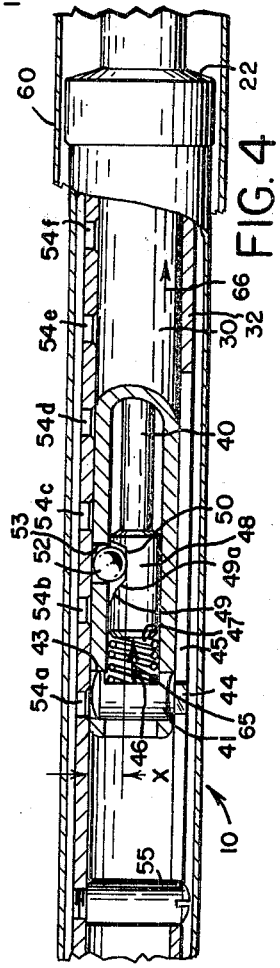
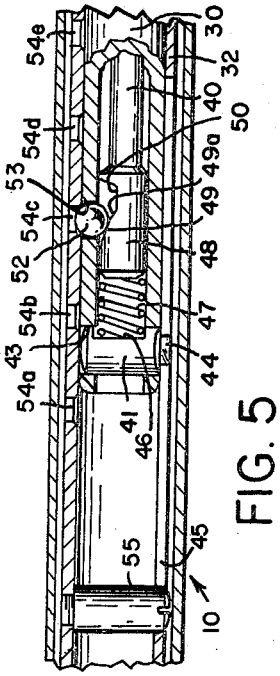
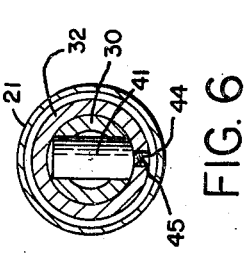
INVENTOR.
DAVID F. MORGAN
BY
Robert W. Doyle
ATTORNEY United States Patent Office 3,491,663
Patented Jan. 27, 1970

3,491,663
EXTENDIBLE STEERING COLUMN
David F. Morgan, Minnetonka, Minn., assignor to Char-Lynn Company, Eden Prairie, Minn., a corporation of Minnesota
Filed Apr. 5, 1968, Ser. No. 719,098
Int. Cl. B62d 1/18
U.S. Cl. 74—493                 10 Claims

ABSTRACT OF THE DISCLOSURE

An extendible steering column comprising inner and outer casings, the inner casing rotatable relative to the outer stationary casing and enclosing a telescoping column adapted to be selectively positioned within the inner casing, utilizing a ball locking member between the telescoping column and the inner casing, urged into locking position therebetween by the action of a continuously biased cam which biasing force may be manually overcome for repositioning of the column within the inner casing.

This invention relates to a device for providing an extendible steering column whereby the steering wheel of a vehicle may be selectively positioned by an operator, and more particularly relates to an extendible steering column utilizing a minimum of parts and a locking mechanism through which torque utilized in controlling the vehicle does not necessarily pass, thereby achieving a high degree of safety.

BACKGROUND OF THE INVENTION

Although many extendible steering columns have been developed and patented in the past, a truly safe and effective steering column has heretofore been marginal. Typical of prior art steering columns are those columns which utilize a plurality of springs which drive locking plugs from an inner casing, telescoping with an outer casing, in response to actuation of the plugs by an operator. A construction of this type must utilize a plurality of springs or other biasing means and other moving parts, thereby resulting in mechanical looseness and undue complexity. Obviously the probability of failure increases as the number of springs and other moving parts increases, and therefore a drive of this type is not desirable. Other extendible columns have been utilized in the past, but have met with only partial success in that the devices have been unduly complicated or difficult to manipulate when selectively positioning the steering wheel relative to the vehicle. Furthermore, known extendible steering columns have been unduly expensive and of such a nature that maximum flexibility as well as maximum safety in the use thereof has not been obtained.

With these comments in mind, it is to the elimination of these and other disadvantages to which the present invention is directed, along with the inclusion therein of other novel and desirable features.

An object of this invention is to provide a new and improved extendible steering column of simple and inexpensive construction and operation.

Another object of this invention is to provide a new and novel extendible steering column which utilizes a minimum of moving parts and biasing means, thereby contributing to the safety of the device, and which is constructed in such a way that additional safety is obtained during operation of the device.

Still another object of this invention is the provision of a new and novel extendible steering column which provides a locking mechanism which securely retains the telescoping column extension in the selected position while eliminating mechanical looseness without the need for providing close tolerance parts.

A further object of this invention is the provision of an extendible steering column which allows all elements thereof to be of substantial structure, thereby reducing mechanical disruption, providing ease of servicing the unit and preventing inadvertent jamming of the unit.

A still further object of this invention is the provision of an extendible steering column which provides a push button release, operable by one hand, thereby obviating the need for removing both hands from the steering wheel and which allows the operator to maintain control of the vehicle during the selective positioning of the steering wheel.

An additional object of this invention is the provision of an extendible steering column which utilizes a locking mechanism which positively and securely locks in position and through which the torque transmitted from the steering wheel to the steering control unit does not necessarily pass.

Another additional object of this invention is the provision of an extendible steering column which utilizes a locking mechanism which, when overloaded, allows the extended column extension to collapse within the inner casing without the unit losing the ability of transmitting torque from the steering wheel to the steering control unit, thereby providing an additional safety factor to the operator.

These and other objects and advantages of this invention will more fully appear from the following description made in connection with the accompanying drawings wherein like reference characters refer to the same or similar parts throughout the several views.

BRIEF DESCRIPTION OF THE DRAWINGS

In the drawing,

FIG. 1 is a diagrammatic view of the extendible steering column of this invention with an alternate steering wheel position shown in dotted lines;

FIG. 2 is a longitudinal sectional view of the extendible steering column shown with portions broken away for clarity and in position for operation of the steering control unit;

FIG. 3 is a partial longitudinal sectional view with portions broken away for clarity and showing a first step in repositioning the steering wheel;

FIG. 4 is a partial longitudinal sectional view showing an intermediate wheel position of the extendible steering column during repositioning of the steering wheel;

FIG. 5 is a partial longitudinal sectional view showing the final step in the repositioning of the steering control; and FIG. 6 is a sectional view taken along the lines 6—6 of FIG. 2.

Description of a preferred embodiment

FIG. 1 diagrammatically shows a typical use of an extendible steering column. The extendible steering column is shown generally at numeral 10, connecting a conventional steering wheel 11 to a commercially available power steering control unit 12. An extended position of the steering wheel is shown in dotted lines as indicated by 11a. Control unit 12 is serviced by a pump, reservoir, pressure relief valve, flow control and filter, indicated schematically at 13. A pair of hydraulic lines 14 connect unit 13 with control unit 12. An actuator mechanism, denoted in general by numeral 15 is controlled by power steering control unit 12 and is connected thereto by a pair of hydraulic lines 16. For ease in placement of control unit 12 on a vehicle, and to maximize vehicle operator comfort, an extendible steering column 10 is typically desired by the vehicle manufacturer. This provision allows greater flexibility in mounting control unit 10 on a vehicle and allows the vehicle operator to safely and quickly position steering wheel 11 between the limits of the extendible steering column to achieve optimum comfort.

Referring now to FIG. 2, control unit 12 includes a column receiving assembly 17 including a socket 17a adapted to receive a steering column of the style desired. Steering column 10 includes a coupling 18 shown mating with socket 17a of control unit 12. The coupling transmits the directional signal from wheel 11, as manipulated by the vehicle operator, to control unit 12. Mounting assembly 19 having flange 19a is provided on column 10. Column 10 is connected to unit 12 by positioning assembly 17 adjacent assembly 19, and joining the members with bolts 20. A commercially available washer 20a is provided between coupling 18 and socket 17a.

An outer casing 21 is joined to flange 19a, typically by welding. Outer casing or housing 21 is typically constructed from tubular steel. Casing 21 encloses the device, and provides a protective covering and seal for the moving parts of the extendible column. Casing 21 is connected to end cap 22, typically by a crimped joint indicated at 23. End cap 22 includes an axial opening 24 adapted to receive a column extension. A bearing assembly 25 is provided in end cap 22 and comprises an outer race 26, an inner race 27 and movable bearing elements such as balls 28 therebetween. The bearing assembly is retained between crimped joint 23 and snap ring 29.

A tubular steel column extension member is indicated at numeral 30 and is supported by bearing 25 for rotatable movement therein about axis 31 and slidably mounted therein at inner race 27 for axial movement along axis 31. An inner tubular steel column extension casing or housing 32 encloses column extension member 30, allowing slidable movement of the extension therein along axis 31, providing a telescoping arrangement therebetween. Housing 32 rotates within outer casing 21 about axis 31, but is not shiftable along axis 31. Inner housing 32 is affixed to coupling 18 at coupling journalled portion 33, as by welding. A coupling spline portion 34 is provided on coupling 18, mating with a splined socket 17a in control unit 12. Coupling 18, of course, rotates with inner casing or housing 32 within stationary outer casing or housing 21.

Column extension 30 extends outwardly from extension housing 32 at end cap opening 24 and is connected to steering wheel 11. A serrated portion 35 of extension 30 is press fit within bore 36 of wheel 11, aligning wheel 11 with the extension 30 and preventing rotational movement therebetween. A threaded portion 37 extends from bore 36 and a nut 38 is threaded thereon, securing the wheel against tapered portion 39 of column extension 30, preventing axial movement.

A cam actuating rod 40 is slidably mounted within extension member 30 for axial movement along axis 31.

A guide pin member 41 is positioned in transverse opening 43 in column extension member 30. A locking or torque transmitting key 44 projects outwardly from member 41 and is integral therewith. Slot 45 in inner casing 32 receives key 44 for axial movement in slot 45 and prevents circumferential movement of column extension 30 relative to the inner casing or housing 32. Key 44, mating with slot 45, transmits torque from steering wheel 11 and column extension 30 to inner casing 32. Therefore, regardless of the axial position of extension member 30 relative to inner casing 32, torque is transmitted from one to the other.

Spring or bias mechanism receiving socket 46 is provided in guide pin member 41 and receives spring or bias mechanism 47, which is positioned to urge or bias rod member 40 away from guide 41 and towards steering wheel 11. Rod 40 includes a cam 48, integral therewith, having a cam ramp or ball engaging ramp 49 with a secondary angulated portion 49a, and a ball receiving pocket 50. The angle of the cam ramp of said cam is substantially 15° relative to the longitudinal axis of said column extension. Cam 48 is arranged in confronting relation to spring 47 and is acted upon by the spring. In the position of column extension 30 relative to inner housing or casing 32, shown in FIG. 2, ramp 49 is shown urging a locking member or ball 52 into opening 53 in column extension 30 and upwardly into locking member receiving openings spaced axially therealong and indicated by 54a, 54b, 54c, 54d, 54e and 54f. Of course, any number of holes may be used with any spacing desired. It should be noted that the ball locking member 52 can carry torque, but primarily determines the axial position of extension member 30 relative to the stationary inner casing 32. As previously noted, torque can also be transmitted by the extension member 30 to the inner casing 32 regardless of the position of extension member 30 relative thereto, and this is especially true at such times as ball 52 is within pocket 50 and not engaging one of the plurality of openings 54a through 54f in casing 32.

A column extension stop member 55 is provided and is secured within inner casing section 32, thereby preventing inward movement of column extension 30 past this point, but allowing rotation of inner casing 32 within outer casing 21.

A rod actuating button 56 is attached to wheel 11 at beaded joint 57. Rod receiving socket 58 is provided and is shown with rod 40 inserted therein. An elastic web structure 59 is provided whereby the vehicle operator may depress the middle portion of button 56 and engage rod 40, urging it downwardly. This downward force overcomes the upward or outward force of spring 47 allowing the vehicle operator to reposition the steering wheel.

Safety cover 60 is provided and is generally tubular in shape and constructed of metal tubing. An annular seal 61 contacts outer casing 21 and provides a wiping action thereagainst as the wheel 11 is extended or collapsed. Safety cover 60 is joined to the wheel 11 in a suitable manner, typically by crimping the ends thereof at 62, wedging the safety cover between bore 36 and tapered portion 39 of column extension 30.

DESCRIPTION OF OPERATION

In the operation of the present invention, the extendible steering column 10 is connected to steering wheel 11 at bore 36 thereof. The steering wheel is drawn tightly against extendible steering column 10 at tapered portion 39 thereof by nut 38 being drawn down on threads 37 of the control unit 10. Rotational movement of wheel 11 relative to column extension 30 is prevented by serrated portion 35 of extension 30 within bore 36. Rotational movement of steering wheel 11 is then transmitted to column extension 30. Inner casing 32 is operably connected to column extension 30 for simultaneous rotational movement. Torque from wheel 11 is transmitted through extension 30 to inner casing 32 by key 44 within slot 45 of casing 32. Casing 32 is attached to coupling 18 which includes spline portion 34 mating with socket 17a of control unit 12. Control unit 12 therefore responds to manipulation of steering wheel 11.

Column extension 30 is slidably mounted within inner casing 32 for telescopic movement along axis 31 within inner casing 32. Travel of extension 30 toward the control unit 12 is prevented by stop member 55 and travel of extension 30 away from control unit 12 is prevented by the termination of slot 45 within which locking key 44 of guide pin 41 travels. Therefore, it is not possible to lose control of the vehicle by overcollapsing or overextending column extension 30.

The selective positioning of wheel 11 may be accomplished without disturbing the ability of the operator to control the vehicle. To reposition the steering wheel, the operator depresses button assembly 56 in the direction indicated by arrow 64 of FIG. 3, overcoming the biasing force of spring 47. It should be noted that guide pin 41 is affixed to column extension 30 and that in depressing button 56, the position of pin 41 is not affected. In overcoming the force of spring 47, cam 48 moves in the direction of arrow 64, allowing locking member 52 to release from opening 54a in member 32 into pocket 50 of cam 48. In the position shown in FIG. 3, locking member 52 is positioned within column extension 30 and does not project outwardly therefrom into opening 54a, as indicated by dimension X. Therefore, extension 30 is free to move axially within casing 32. However, separate rotational movement is prevented by the action of locking key 44 within slot 45 of casing 32. In the event the extendible steering column is oriented in a position in which gravity does not operate on the locking member, the sliding motion between the members urges the locking member into the locking member receiving pocket.

As shown in FIG. 4, locking member 52 is in an intermediate position between openings 54b and 54c of casing 32 and is slidable therebetween, as indicated by dimension X. Spring or biasing means 47 is constantly urging the cam in the direction of arrow 65 which effectively tends to urge locking member 52 upwardly. The direction of travel of column extension 30 is indicated by arrow 66 of FIG. 4. This movement, of course, can be in either direction as determined by the operator without changing the effect of spring 47 on cam 48. In the position shown in FIG. 4 the operator could release the button 56 and simply grasp the steering wheel with one hand, urging it in the direction desired.

FIG. 5 shows the completed repositioning of the steering wheel with locking member 52 projecting from opening 53 of extension 30 into casing opening 54c which is in registry with opening 53 of extension 30. Since the operator released button 56 when locking member 52 was between opening 54b and 54c, the locking member sought the next opening which was 54c by the action of spring 47 on cam 48 (see FIG. 5). When utilizing a ball locking member the diameter of the ball is less than opening 53 but greater than openings 54a–54f.

It should be noted that cam ramp 49a is at a steeper angle relative to the longitudinal axis than is ramp 49. This enables a pocket to be formed in less length by utilizing a shorter overall ramp.

In the locking position, an overload condition may occur and an impact against the steering wheel would be transmitted axially through the column extension 30 to locking member 52. A force reaction results at the point between extension 30 and casing 32, allowing locking member 52 to drop from the opening in casing 32, allowing the extension to collapse within the casing. As the incline of ramp 49 approaches the longitudinal axis of the device, locked positions will be more secure. Of course, the converse is true. In this way the effect of a given overload on the device can be controlled.

It should be noted that there is a shearing action on ball locking member 52 at the overload instance, between casing 32 and extension 30. A locking member material could be selected which would shear at a predetermined force and absorb part of the impact force to provide an additional safety factor. Alternately, a casing member material or configurations could be selected which would absorb energy by metal deformation at the time of overload.

It should also be noted that cam 48 and spring 47 could be reversed with the spring caged on the other side of cam 48 and the cam ramp facing the opposite direction. In this released position the operator would simply pull, rather than push, rod 40 to selectively position the steering wheel.

It will, of course, be understood that various changes may be made in the form, details, arrangement and proportion of the various parts without departing from the scope of this invention.

What is claimed is:
1. An extendible steering column adapted to connect a steering wheel and a steering control unit, said extendible steering column comprising
   a tubular casing member having a coupling mechanism affixed thereto at one end thereof and an opening at the other end thereof, the coupling mechanism adapted to be connected to a steering control unit for rotational movement thereof and said casing member having a plurality of transverse openings therein spaced axially therealong,
   a tubular column extension slidably mounted in said casing member for telescoping axial movement therein, with one end thereof projecting outwardly from the opening in said casing member and adapted to be connected to a steering wheel at the projecting end, said column extension operably connected to said casing member by pin means, transmitting rotational movement thereof to said casing member, said extension having a transverse opening therein adapted to be positioned in registry with a predetermined transverse opening in said casing member,
   a cam slidably mounted within said column extension, said cam including a locking member receiving pocket and cam ramp projecting therefrom and continuous therewith,
   a locking member shiftably mounted in the locking member receiving pocket of said cam, said locking member adapted to be alternately positioned in open position allowing axial movement between said casing member and said extension column, and in locking position between said members preventing axial movement therebetween,
   a cam biasing mechanism operably connected to said cam urging the cam ramp of said cam into engagement with said locking member thereby urging said locking member into locking position with said column extension and casing member whereby said locking member prevents axial movement between said column extention and said tubular casing when the transverse opening of said column extension is in registry with a predetermined transverse opening of said casing member, and
   actuating means connected to said cam biasing mechanism whereby the force of said cam biasing mechanism may be overcome, allowing said locking member to return to the open position thereby providing for repositioning of said column extension within said casing member.

2. The extendible steering column of claim 1, said pin means including
   a guide pin positioned at the end of said column extension opposite the steering wheel mounting end, said guide pin retaining said cam biasing mechanism urging said cam outwardly toward said steering wheel end and
   wherein said actuating means includes an axially oriented rod slidably mounted in said column extension and affixed to said cam whereby urging of said rod inwardly toward the steering control end of said column extension overcomes the biasing force of said biasing mechanism providing for return of said locking member to the pocket in said cam.

3. The extendible steering column of claim 2 wherein said guide pin includes a locking key attached thereto and wherein
   said casing member includes a locking key receiving slot receiving said locking key whereby the axial movement of said column extension in said casing member in the direction of the steering wheel end thereof is terminated and whereby torque is transmitted from said column extension to said casing member.

4. The extendible steering column of claim 2 wherein the ramp of said cam is angulated.

5. The extendible steering column of claim 2 wherein said biasing mechanism includes a spring caged between said guide pin and said cam.

6. The extendible steering column of claim 1 including a column extension stopping pin affixed in said casing member preventing axial movement of said column extension in the direction of the steering control unit end thereof past a predetermined position and securing said extendible steering column in assembled condition.

7. The extendible steering column of claim 1 wherein the angle of the cam ramp of said cam is substantially 15 degrees relative to the longitudinal axis of said column extension.

8. The extendible steering column of claim 7 wherein the angle of the cam ramp is less than 15 degrees.

9. The extendible steering column of claim 7 wherein the angle of the cam ramp is greater than 15 degrees.

10. The extendible steering column of claim 1 wherein said locking member is spherically shaped and the transverse opening in said column extension is circular and of a diameter greater than the diameter of said sphere locking member and wherein said transverse openings in said casing member are circular and of a diameter less than the diameter of said sphere locking member.

References Cited

UNITED STATES PATENTS

| 3,302,478 | 2/1967 | Pauwels | 74—493 |
| 3,306,127 | 2/1967 | Rieger | 74—493 |
| 3,218,882 | 11/1965 | Stephens et al. | 74—527 |

MILTON KAUFMAN, Primary Examiner

U.S. Cl. X.R.

74—527